United States Patent [19]
Lee

[11] Patent Number: 5,815,270
[45] Date of Patent: Sep. 29, 1998

[54] IN-LINE FIBER-OPTIC POLARIMETER USING A FUSED 1X5 STAR COUPLER

[75] Inventor: Shing M. Lee, Fremont, Calif.

[73] Assignee: Board of Supervisors of Louisiana State University and Agricultural and Mechnical College, Baton Rouge, La.

[21] Appl. No.: 902,317

[22] Filed: Jul. 29, 1997

[51] Int. Cl.$^6$ .................................................. G01B 11/00
[52] U.S. Cl. ........................ 356/367; 356/364; 356/365; 356/369
[58] Field of Search ................................... 356/364, 365, 356/367, 369

[56] References Cited

U.S. PATENT DOCUMENTS

| | | | |
|---|---|---|---|
| 4,158,506 | 6/1979 | Collett | 356/365 |
| 4,306,809 | 12/1981 | Azzam | 356/369 |
| 4,681,450 | 7/1987 | Azzam | 356/367 |
| 4,725,145 | 2/1988 | Azzam | 356/369 |
| 5,298,972 | 3/1994 | Heffner | 356/364 |
| 5,517,309 | 5/1996 | Barker | 356/367 |

OTHER PUBLICATIONS

R.M.A. Azzam, "In–Line Light–Saving Photopolarimeter and Its Fiber–Optic Analog," Optics Letters, vol. 12, pp. 558–560 (1987).
Azzam et al., "General Analysis and Optimization of the Four–Detector Photopolarimeter," Opt. Soc. Amer. A, vol. 5, pp. 681–689 (1988).
Scholl et al., "Fiber Optic In–Line Polarimeter—System Design and Computer Aided Analysis," SPIE Proceedings, vol. 2265, pp. 48–53 (1994).
Scholl et al., "In–Line Fiber Optic Polarimeter with a 99% Coupler," Opt. Engin., vol. 34, pp. 1669–1671 (1995).
S.M. Lee et al., "In–Line Fiber–Optic Polarimeter Using a Fused 1x5 Star Coupler," SPIE Proceedings, vol. 2839, pp. 133–148 (1996).
S.M. Lee et al., "In–Line Fiber–Optic Polarimeter Using a Fused 1x5 Star Coupler," Abstract presented SPIE Annual Meeting, Denver, Aug. 7, 1996.
R.M.A. Azzam, "Integrated Polarimeters Based on Anisotropic Photodetectors," Optics Letters, vol. 12, pp. 555–557 (1987).
R.M.A. Azzam, "Longitudinal Polarization–Dependent Coupling of Light from an Optical Fiber to a Side–Bonded Planar Proximity Detector: Application to Integrated Azimuthally Distributed Multidetector Photopolarimeters," IEEE Photonics Technology Letters, vol. 2, pp. 893–895 (1990).
R. Ulrich et al, "Bending–Induced Birefringence in Single–Mode Fibers," Optics Letters, vol. 5, pp. 273–275 (1980).
R. Ulrich et al, "Polarization Optics of Twisted Single–Mode Fibers," Applied Optics, vol. 18, pp. 2241–2251 (1979).
Shang–Yuan Huang et al, "Perturbation Effects on Mode Propagation in Highly Elliptical Core Two–Mode Fibers," Journal of Lightwave Technology, vol. 8, pp. 23–33, (1990).

Primary Examiner—Frank G. Font
Assistant Examiner—Reginald A. Ratliff
Attorney, Agent, or Firm—Bonnie J. Davis; John H. Runnels

[57] ABSTRACT

An all fiber-optic in-line photopolarimeter is disclosed. This photopolarimeter replaces the conventional 1x2 coupler, bulk beamsplitter and accompanying optics with a single 1x5 star coupler. This system can measure state of polarization of light in a fiber in situ.

7 Claims, 2 Drawing Sheets

IN-LINE FIBER-OPTIC POLARIMETER USING A FUSED 1X5 STAR COUPLER

The development of this invention was partially funded by the Government under grant NOOO 14-94-2-0011 from the Office of Naval Research. The Government may have certain rights in this invention.

This invention pertains to a new apparatus for measuring the state of light polarization in an optical fiber.

The development toward longer transmission distances and higher information transfer rates for fiber optic communication and sensor technologies increases the importance of measuring the polarization state of a fiber. The polarization transfer characteristics of an optical fiber device are important in the design of coherent lightwave communications systems. The transfer properties of fiber optic devices, e.g., isolators, couplers, and optical amplifiers, depend on the polarization state in the fiber. To completely characterize these devices, the relationship of the input and output states of polarization (SOP) of the fiber-optic system must be known.

The conventional method for measuring the SOP of a light beam is to align a waveplate and a linear polarizer in the optical path of the beam. The waveplate is rotatable about the optical axis and typically is a quarter-wave plate. An optical sensor, a photodetector, is positioned to measure the intensity of light transmitted by the waveplate and polarizer. In operation, the waveplate is sequentially rotated to a minimum of four angular positions about the optical axis relative to the linear polarizer, and the transmitted light intensity is measured at each position by the photodetector. A disadvantage of this method is the mechanical movement of the waveplate and the resulting slow speed of measurement. Additionally, since every optical element has to align in free space, minaturization of such a device is not possible.

Because conventional photopolarimeters are not compatible with fiber-optic technology, in-line fiber-optic photopolarimeters (IFOPs) have been developed. See R. M. A. Azzam, "In-line Light-saving Photopolarimeter and its Fiber-optic Analog," Opt. Lett., vol. 12, pp. 558–560, 1987. IFOPs allowed measurement of all four Stokes parameters of the guided light, and hence could detect polarization changes in situ.

The first IFOPs proposed were fiber-optic analogs of the four-detector photopolarimeter. See Azzam et al., "General Analysis and Optimization of the Four-detector Photopolarimeter," Opt. Soc. Amer. A, vol. 5, pp. 681–689 (1988). See also U.S. Pat. No. 4,681,450. The basic principle of this early design was that each of four solid state detectors absorbed only a small portion of optical radiation, while reflecting the rest of the light to the next detector. The in-line SOP was measured by four successive detectors placed along the fiber side. Each detector developed an electrical signal proportional to the polarization-dependent fraction of light that it absorbed from the fiber guide. The four outputs were used to determine the four Stokes parameters of light in the fiber via an instrument matrix determined by calibration.

Similar photopolarimeters have also been made with a side-polished fiber and side-bonding detectors. See Scholl et al., "Fiber Optic In-line Polarimeter—System Design and Computer Aided Analysis," SPIE Proceedings, vol. 2265, pp. 48–53 (1994). Four detection points were formed by grinding off the cladding from one side of the fiber. A small part of the light was coupled out at these points, and was measured by a standard photodetector placed just on top of the polished area. At each of the detection points, a polarization dependent signal was obtained. Hence, a relationship between these signals and the polarization at the end of the fiber was found by calibrating the instrument with a classical off-line polarization analyzer.

There are several drawbacks to the above approaches: precision side-polishing of a fiber is a difficult process; and the evanescent coupling efficiency is generally low which results in low reproducibility.

A recently developed IFOP used an 1×2 fused optic-fiber coupler to divert some incident optical power into a conventional division-of-aperture photopolarimeter, while the rest of the optical power remains in-line. See Scholl et al., "In-line fiber optic polarimeter with a 99% coupler," Opt. Engin., vol. 34, pp. 1669–1671 (1995). At the low power output port, a standard beam-splitter was used to split the light into four beams. The SOP was determined from these four beams by using a standard arrangement of detectors, linear polarizers, and a quarter-wave retarder.

A major obstacle to constructing an all-fiber polarimeter has been that the SOP of a light beam changes uniquely for each fiber. See S.-Y. Huang et al., "Perturbation Effects on Mode Propagation in Highly Elliptical Core Two-Mode Fibers," J. Lightwave Technology, vol. 8, pp. 23–33 (1990); R. Ulrich et al., "Bending-Induced Birefringence in Single-Mode Fibers," Optics Letters, vol. 5, pp. 273–275 (1980); and R. Ulrich et al., "Polarization Optics of Twisted Single-Mode Fibers," Applied Optics, vol. 18, pp. 2241–51 (1979). Furthermore, the polarization changes due to stresses in the fiber leads and the coupler. Therefore, the output SOP is generally different from the input SOP. Twisting of the fibers in the star coupler and its leads induces a circular birefringence. Therefore, the principal optical axes for each light beam are not known with respect to the reference coordinate.

U.S. Pat. No. 5,298,972 discloses an instrument which produces a light beam split into four beams by using a focusing concave mirror that does not change the orientation of the optical axes of the light beam.

U.S. Pat. No. 4,681,450 discloses a photopolarimeter that measures the SOP by placing four photodetectors in succession, each one receiving a reflected light beam from the prior photodetector.

U.S. Pat. No. 4,158,506 discloses a system to measure the SOP of laser optical pulses with a six-element optical detector assembly.

I have discovered a novel in-line all fiber-optic photopolarimeter. This invention (1) replaces the prior 1×2 coupler, the bulk beamsplitter, and the accompanying optics with a single 1×5 star coupler; (2) replaces the linear polarizer by using a polarizer fiber; and (3) replaces the quarter-wave retarder by using an in-line single-mode fiber polarization controller. This system is properly calibrated to compensate for unpredictable changes in the orientation of the optical axes of a light beam traversing the fiber optic components. This new system can measure the SOP of light in a fiber in situ. The advantages of this IFOP over prior ones include (1) instantaneous response, limited only by detector sensitivity and speed; (2) low alignment requirement with uses of fiber-optic connectors, couplers, and detector modules; (3) low cost; (4) greater reproducibility; (5) high sensitivity with the elimination of diffraction loss; and (6) compactness and low weight when combined with available fiber-optic components.

I have demonstrated the new in-line fiber optic photopolarimeter using a 1×5 fused fiber-optic star coupler. The new system is capable of measuring all Stokes parameters of partially polarized light with accuracy comparable to that of a calibrating off-line polarimeter (1%). All five output beams of the star coupler can be tuned to have nearly identical states of polarization, except that they have unknown orientations of optical axes. The photopolarimeter output is taken from one of the star coupler output beams, whose state of polarization is measured from the other four beams. Compared to conventional photopolarimeters, the linear and circular analyzers are aligned with the respective beam optical axes as determined from calibration. Such a system is compact, light weight, efficient, robust and inexpensive.

Figure 1:
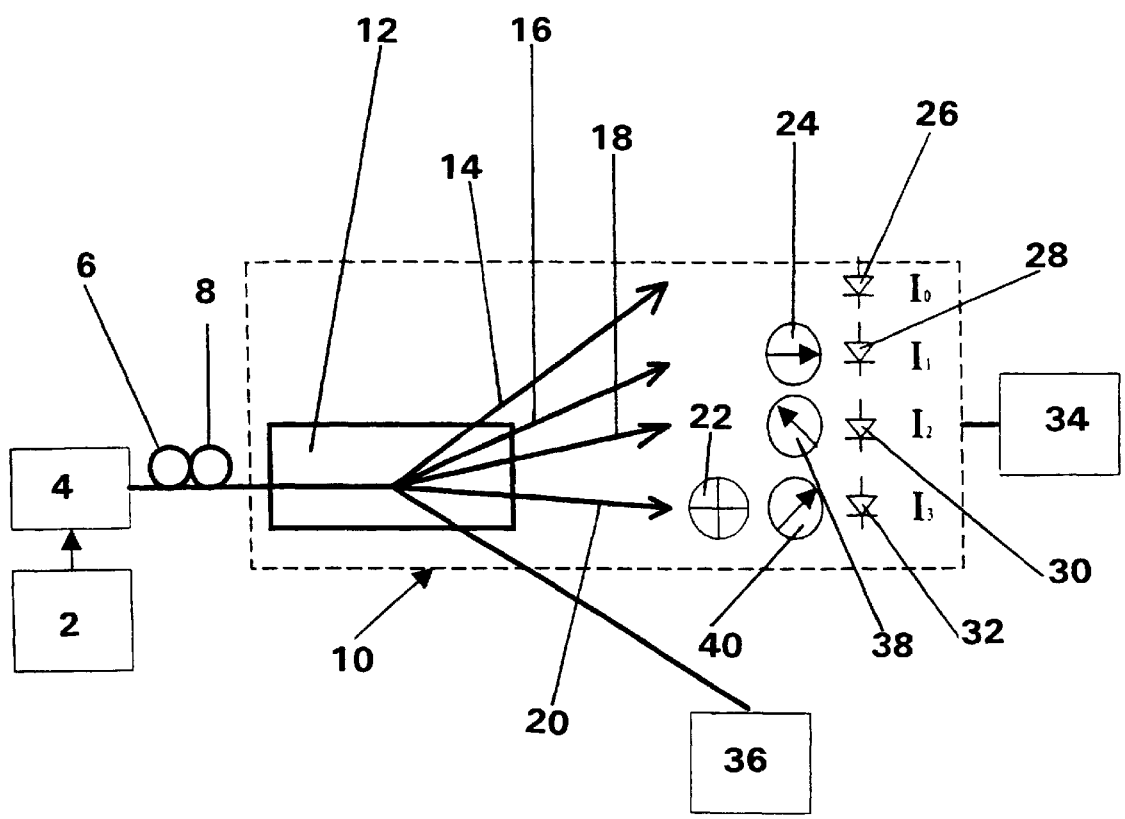
FIG. 1 illustrates schematically an in-line fiber optic polarimeter using a 1×5 star coupler and the experimental calibrating and testing setup.

A conventional polarimeter has linear and circular polarized detectors arranged in such a way that the determinant of the instrument matrix is maximized. Three main problems exist with using a bulk beamsplitter in a conventional photopolarimeter design: (1) it is sensitive to the direction of incoming light; (2) the beamsplitters are polarization-dependent; and (3) it is inherently bulky and susceptible to vibration. The first problem requires precision alignment; the second and third problems make the polarimeter difficult to transport and install. This invention replaced the beam splitter and the 1×2 fiber coupler with a single 1×5 fused star coupler as shown in FIG. 1. The star coupler is compact, relatively inexpensive, commercially available, and compatible with many existing fiber-optic components. Therefore, the first and third problems mentioned above do not exist with the star coupler. However, similar to the bulk beamsplitters, star couplers are polarization-dependent. A polarimeter can use imperfect polarization elements so long as they are properly calibrated, as discussed further below.

FIG. 1 illustrates schematically the IFOP 10 and the calibration equipment. To calibrate the IFOP, a laser light source plus a device to transform the polarization of light is needed. The laser light source comprised a laser diode driver 2 and a laser diode 4. The polarization transformer comprised a rotating quarter-wave plate 6 followed by another rotating half-wave plate 8. The IFOP 10 comprised a 1×5 star fiber coupler 12, a quarter-wave controller 22, three polarizers (24, 38 and 40), and four photodetectors (26, 28, 30, and 32). The signals from the four photodetectors are transmitted to a microprocessor 34. One beam of light from the 1×5 star coupler can be sent to an off-line photopolarimeter 36 for calibrating and for comparing experimental results.

To make the system more compact and rugged, all bulk optic elements were replaced with fiber-optic components. A fiber-loop, an in-line single-mode fiber quarter-wave controller 22, replaced the conventional quarter-wave plate, and three polarizer fibers (24, 38, and 40) replaced the three linear polarizers. Because of the use of these components, small area detectors, e.g., Indium-Gallium-Arsenide ("InGaAs") detectors, (26, 28, 30, and 32) in a FC receptacle were used in place of large area detectors, e.g., Germanium ("Ge") detectors. Furthermore, because of the use of fiber-optic in-line polarizers, polarization transformers, and connectorized detectors, the guide light needed not leave the fiber until it reached the detector, which greatly enhanced the sensitivity of the polarimeter by eliminating the diffraction loss. The alignment of fiber axes in the polarimeter was of paramount importance. Rotatable connectors for polarizer fibers and the coupler outputs are used for easy alignment.

FC connectors without locking keys were used for an efficient coupling and stable alignment. These replacements made the polarimeter not only easier to transport, but less expensive to package.

Among the most important considerations in constructing the IFOP were polarization changes due to stresses in the fiber leads and the coupler. It is well known that stress-related effects on fibers induce changes in SOPs. Therefore, the output SOPs of a star coupler are generally different from the input SOP. Because all five output beams in the 1×5 star coupler experience similar twists and bends, all output SOPs can be fine tuned to be nearly identical except for a difference in optical axis orientation. The SOP for one of the beams can be determined from that of the other four beams when the stress effects on the fiber leads are taken into account. The bending in a fiber induces a linear birefringence. The fiber leads were kept as short and as free of stress as possible to avoid SOP drifting among the star coupler outputs. Twisting of fibers in the star coupler and its leads induced a circular birefringence. Therefore, the principal optical axes for each beam were not known with respect to laboratory reference coordinates. They were determined and compensated for using the calibration process described below, before assembling the IFOP.

Detecting the SOP of light involves the use of polarizers, a quarter-wave retarder, and photodetectors. The use of a conventional bulk polarizer and retarder creates a need for collimating optics from the fiber and detectors for an efficient collection of light. The bulk polarizers were replaced with polarizer fibers (24, 38, and 40). The polarizer fibers performed as well as a traditional linear polarizer, but were more compatible with other fiber-optic components.

The quarter-wave retarder was replaced with an in-line single-mode fiber quarter-wave controller 22. This resulted in less bending-induced light energy loss. The attenuation of light decreased more quickly than the birefringence as the radius increased. It was possible to achieve a coil radius above which there was sufficient birefringence with minimal attenuation by using multiple loops of fiber in one coil. Another advantage of the in-line single-mode fiber quarter-wave controller was that it was less bulky than the traditional liquid crystal retarder, and more compatible with other fiber-optic components.

The basic principle of using a single-mode fiber to make a polarization controller is that the bending of such a fiber causes a linear birefringence. This birefringence can be used to create a fiber-optic analogue of the rotating fractional wave plate. When the fiber is bent, the stress in the fiber produces a linear birefringence with the fast axis in the plane of the loop. The slow axis is normal to the loop. The induced birefringence is given as:

$$\beta = 0.5 C_s \frac{r^2}{R^2} \; rad/m$$

where $$C_s = 0.5 k_o n_o^3 (p_{11} - p_{12})(1 + v_p),$$

r is the radius of the fiber; R is the radius of curvature; $k_o$ is the propagation constant of the light; $n_o$ is the average refractive index of the fiber; $p_{11}$ and $p_{12}$ are the components of the strain optical tensor of the fiber material; and $v_p$ is Poisson's ratio.

The total phase shift introduced by a single coil of radius R is then:

$$\theta = 0.5 C_s \frac{r^2}{R^2} 2\pi R$$

The radius of the loop and number of the loops determine the fractional rotation of the wave plate. Rotation of the coil about the axis of the device is equivalent to rotating the fractional-wave plate. The birefringence due to the twist introduced into the fiber by this rotation is negligible, so that only the orientation of the coil with respect to the input fiber determines the wave plate axis.

The relative optical axis orientations were determined before assembling the optical photopolarimeter. Such orientations with respect to laboratory coordinates were determined by the following calibration processes, which are described more fully below: (1) the polarization transformer was adjusted until the off-line photopolarimeter indicated a linear polarization in the IFOP output; and (2) the optical reference axis for each of the other four beams was then determined using a rotatable linear polarizer in front of a detector. When rotating the polarizer, maximum and minimum output intensities were observed. Minor adjustments of position and twist of the fiber leads were needed to obtain a linear polarization output from all outputs. A typical measured polarization extinction ratio was about −20 dB. The axis with maximum detector current was chosen as the reference axis for each beam.

To determine the axis of each polarizer fiber, the polarization transformer was connected to one end of the polarizer fiber. The other end of the polarizer fiber was connected to a large area germanium photodetector. The polarization transformer was adjusted until a maximum output intensity was achieved from the germanium photodetector. Then a linear polarizer with a known axis was placed between the polarizer fiber and the photodetector. By turning the linear polarizer, a maximum output from the photodetector was reached. At this point, the axes of the linear polarizer and the polarizer fiber should be parallel. The end of the polarizer fiber was marked to indicate an axis parallel to that of the linear polarizer. In a similar manner, the axis of the other end of the polarizer fiber was determined. To confirm that the fiber could be used as a polarizer, the linear polarizer was turned 90°. The photodetector should read a minimum output intensity. The typical measured polarization extinction ratio was about −20 dB. Both ends of the polarizer fiber were polished before use. Three polarizer fibers were used in the construction of the IFOP, labelled 24, 38, and 40, in FIG. 1.

To determine the alignment of a single-mode fiber quarter-wave device, the polarization transformer was connected to the input of a single-mode 1×5 star coupler (Kaifa Technology). One output of the star coupler was connected to an off-line polarimeter, an HP 8509A polarization analyzer. The fiber was straightened between the coupler and the analyzer. The polarization transformer was turned until a linear SOP output from the analyzer was obtained. A single-mode fiber was used to make two loops with a diameter of 2.3 cm, and the loops were fixed on an adjustable rack. The fiber was then connected to the analyzer again. The coil radius determined the fractional rotation of a wave plate, while the orientation of the coil with respect to the input fiber determined the wave plate axis. The coil radius and the orientation of the coil were adjusted until a circular SOP was obtained from the analyzer. At this time, the total effect of the birefringence was induced by the fiber loops and the fiber acted as a quarter-wave plate. This single-mode quarter-wave device 22 was then used to construct the IFOP.

The IFOP was constructed as shown in FIG. 1. The polarization transformer (6 and 8) was adjusted to obtain a linear SOP at the polarization analyzer 36. Then linear SOPs were obtained at ports 0, 1, and 2 by adjusting the respective fibers. If the SOPs were linear, then almost zero output intensities were obtained from the respective photodetectors (26, 28 and 36) when the linear polarizer was rotated. The axes of the three linear SOPs ($I_0$, $I_1$, and $I_2$) were aligned to be parallel to one another. In this case all axes of the three linear outputs $I_0$, $I_1$, and $I_2$ were horizontal. A linear polarizer was used to confirm whether these three axis directions were the same. Then a circular SOP was obtained at $I_3$ by adjusting the orientation of the coil and the fiber in the single-mode fiber quarter-wave controller 22. When the SOP was circular, the output intensity was almost the same while the linear polarizer was rotated.

Then the three fiber polarizers (24, 38, and 40) were connected to the star coupler output $I_1$, $I_2$, and $I_3$ with 45° differences respectively of the fiber polarizing axes. To connect the output of the star coupler to the polarizer fibers, FC connectors without locking keys were used for efficient coupling and stable alignment. After confirming that the maximum intensity output was coupled from the polarizer fiber, the bulky germanium detector was replaced with an InGaAs detector 26 at the first beam 14, a second InGaAs detector 28 with a polarizer fiber aligned in parallel with the beam reference axis 24 at the second beam 16, a third InGaAs detector 30 with a polarizer fiber aligned at −45° to the reference beam axis 38 at the third beam 18, and the fourth InGaAs detector 32 with a single-mode fiber quarter-wave controller 22 and a polarizer fiber at the fourth beam 20.

The output signal was too weak to transmit directly to an analog-to-digital converter. Four amplifiers were first used to increase the output signals. The four amplifiers were then interfaced with a microprocessor 34, which received a digitized output whose intensity was directly related to the light intensity. The amplitude of the electrical signals produced by the photodetectors was used to determine the Stokes parameters of the incoming light beam, as discussed further below.

EXAMPLE

As shown in FIG. 1, the polarization generator (Oz Optics) comprised a 5 mW laser (laser diode driver 2 and laser diode 4) at λ=1550 nm, and a polarization transformer which comprised a rotating quarter-waveplate 6 followed by another rotating half-waveplate 8. These elements were used to calibrate the components of the in-line fiber-optic photopolarimeter 10. One of the star coupler output beams was designated as the IFOP output, which was monitored with an off-line photopolarimeter 36, e.g., an HP 8509A polarization analyzer. The other four output beams of the 1×5 star coupler were used for the instrument matrix A as discussed below. The amplitude of the coupler outputs need not be the same. It would be desirable to have a larger fraction of light at the output beam to the off-line photopolarimeter 36.

A suitable mathematical representation for SOP is the Stokes vector, because its four components are directly related to the measurement vector. See R. M. Azzam, p. 559 (1987). The Stokes vector can be represented by $S_{out} = [S_0\ S_1\ S_2\ S_3]^t$. (t indicates the transpose.) Its relationship with the corresponding detector current vector $I = [I_0\ I_1\ I_2\ I_3]^t$ can be expressed as $$I = A S_{out}$$

where A is the 4×4 instrument matrix, and $I_0$, $I_1$, $I_2$, and $I_3$ are detector currents at the four coupler output beams. The instrument matrix was determined by calibration against the off-line photopolarimeter. A properly designed IFOP will have a non-singular instrument matrix. Therefore, the output Stokes vector can be determined from the detector current vector after the IFOP is properly calibrated by the following relation:

$$S_{out} = A^{-1} I.$$

To obtain A through calibration, at least four current vectors corresponding to four linearly independent output Stokes vectors have to be measured. To obtain an accurate A, the system needs to be calibrated over a full range of elliptical states, i.e., many more calibrating points should be used than the minimum of four. For N sets of sample data points, the system matrix $A^{-1}$ can be calculated using a least square fit technique as follows:

$$A^{-1} = [S_{out}^1 \ S_{out}^2 \ldots S_{out}^N][I^1 \ I^2 \ldots I^N]^{-1}$$

However, the usual figure-of-8 test to guarantee sufficient variety of Stokes vectors on the IFOP is impractical due to the unknown evolution of the SOP through the input lead fiber and the 1×5 star coupler. To calibrate the system over a full range of elliptical states, the output Stokes and detector current vectors were recorded at 20° increments of the quarter-wave plate, and 15° increments of the half-wave plate in the polarization transformer. A typical system matrix for the IFOP using a 1×5 star coupler was obtained using N=81 sets of sample points as follows:

$$A^{-1} = \begin{Vmatrix} 0.01424 & 0.00035 & 0.00121 & -0.00176 \\ 0.02432 & -0.01072 & -0.02963 & -0.01651 \\ -0.00771 & 0.02695 & -0.00677 & -0.00683 \\ -0.00765 & -0.00065 & -0.01237 & 0.03456 \end{Vmatrix}$$

Figure 2A:
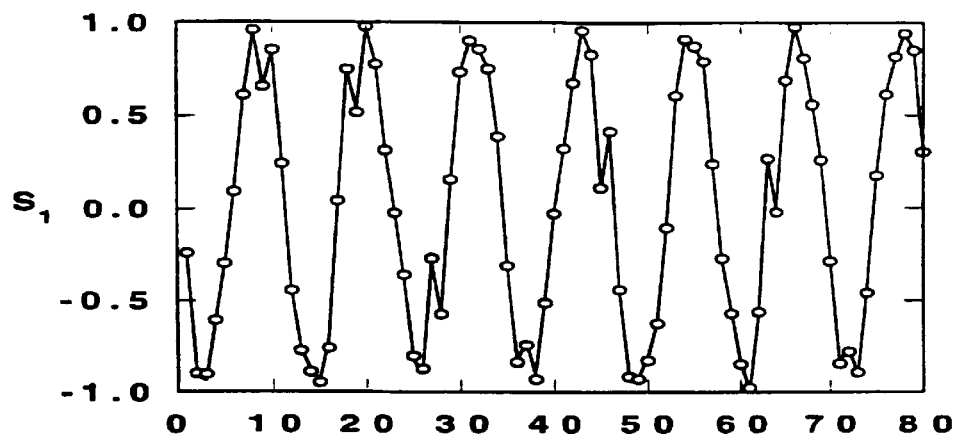
FIGS. 2(a)–(c) illustrate a comparison of measured normalized Stokes parameters and calculated values.
Figure 2B:
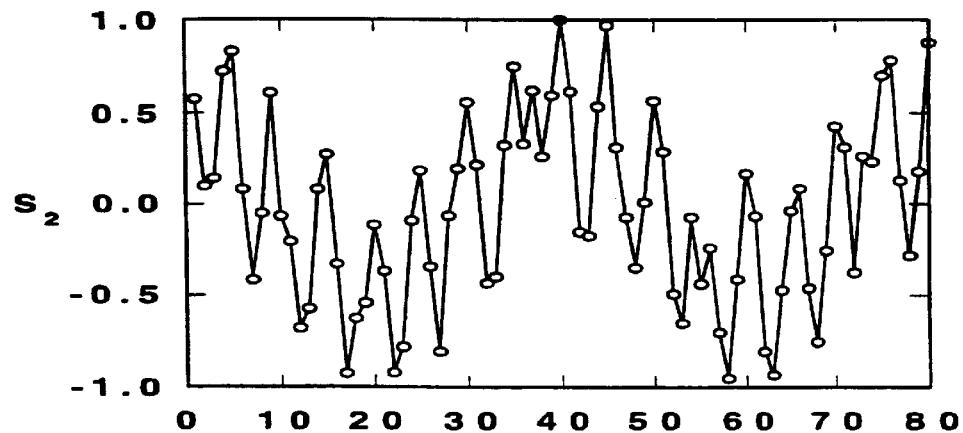
Figure 2C:
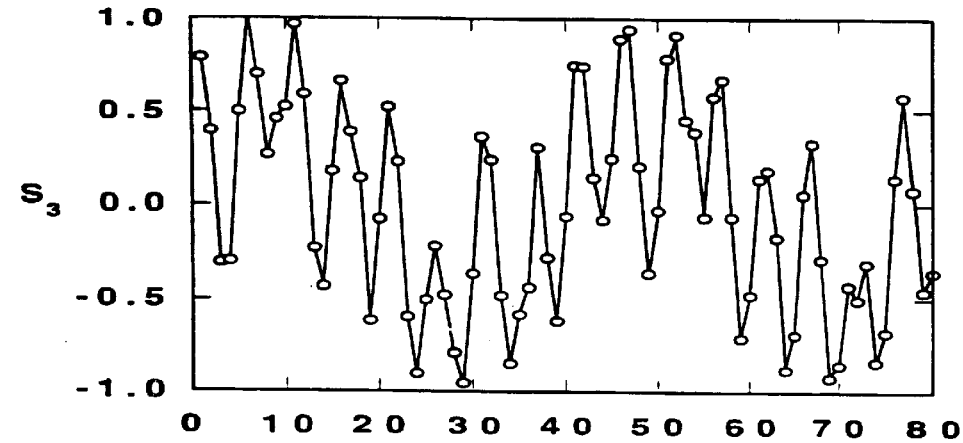

FIG. 2 shows a comparison of measured Stokes parameters from the off-line photopolarimeter (solid line) and their calculated counterparts using the above system matrix $A^{-1}$ (circles). The values have been normalized to the $S_0$ value. FIG. 2(a) shows the comparison for the $S_1$ Stokes parameter; FIG. 2(b) the $S_2$ Stokes parameter; and FIG. 2(c) the $S_3$ Stokes parameter. The sample points were taken at 20° increments of the quarter-waveplates. The abrupt changes in the Stokes parameters every nine sample points were due to a 20° rotation of the half-wave plate. The sum of the normalized residual root-mean-square error for the Stoke parameters was about 1%. Considering that the HP 8509A polarization analyzer has an accuracy of only two significant figures, the agreement between the off-line and in-line photopolarimeter measurements was striking. The calibration processes have been demonstrated to be very reproducible.

With the calculated instrument matrix, the polarization at the output of the in-line all-fiber-optic photo-polarimeter can be calculated continuously. Hence, this polarimeter can be coupled to any setup.

The polarimeter was calibrated as described at λ=1550 nm using a 5-mw laser diode. Operation at other wavelengths is also possible of course. The instrument matrix A should be determined by calibration for each desired wavelength.

In another embodiment the loss of light power during the measurement process is decreased by replacing the 1×5 coupler with a 99:1 (or other high ratio) coupler, together with a 1×4 tree coupler. The output intensities $I_n$ are obtained from the four output beams of the 1×4 tree coupler, which consumes a much smaller fraction of the light power to measure the Stokes parameters.

The complete disclosures of all references cited in this specification are hereby incorporated by reference. In the event of an otherwise irreconcilable conflict, however, the present specification shall control. Also incorporated by reference are the complete disclosures of the following, none of which are prior art to the present invention: S. M. Lee et al., "In-Line Fiber-Optic Polarimeter Using a Fused 1×5 Star Coupler," SPIE Proceedings, vol. 2839, pp. 133–143 (1996); S. M. Lee et al., "In-Line Fiber-Optic Polarimeter Using a Fused 1×5 Star Coupler," Abstract presented SPIE Annual Meeting, Denver, Aug. 7, 1996; and Wei-Ping Pan, "Design of In-Line All-Fiber Optic Photopolarimeter," a Thesis submitted to Graduate Faculty of University of New Orleans in partial fulfillment of the requirement for the degree of Master of Science in the Department of Electrical Engineering (May 1997).

I claim:

1. A photopolarimeter for measuring the state of polarization of a light beam, comprising:

(a) a 1×5 fiber optic coupler, capable of splitting a light source into at least five beams;

(b) a first photodetector for measuring the first beam, said first photodetector producing a first output signal corresponding to the radiation absorbed by said first photodetector;

(c) a second photodetector for measuring the second beam, coupled with a polarizer whose axis is parallel to the optical axis of the second beam, said second photodetector producing a second output signal corresponding to the radiation absorbed by said second photodetector;

(d) a third photodetector for measuring the third beam, coupled with a polarizer whose axis is 45° to the optical axis of the third beam, said third photodetector producing a third output signal corresponding to the radiation absorbed by said third photodetector; and (e) a fourth photodetector for measuring the fourth beam, coupled with a polarizer and a quarter-wave retarder aligned with the fourth beam axis, said fourth photodetector producing a fourth output signal corresponding to the radiation absorbed by the said fourth photodetector;

the state of polarization may be determined from the four output signals and calibration coefficients characteristic of the photopolarimeter.

2. A photopolarimeter as in claim 1, wherein at least one of said photodetectors comprises a germanium detector.

3. A photopolarimeter as in claim 1, wherein at least one of said photodetector comprises an Indium-Gallium-Arsenide detector.

4. A photopolarimeter as in claim 1, wherein at least one of said polarizers comprises a linear polarizer.

5. A photopolarimeter as in claim 1, wherein at least one of said polarizers comprises a polarizer fiber.

6. A photopolarimeter as in claim 1, wherein said quarter-wave retarder comprises a quarter-wave plate.

7. A photopolarimeter as in claim 1, wherein said quarter-wave retarder comprises an in-line single-mode fiber quarter-wave controller.

* * * * *